United States Patent [19]
Armbrust

[11] Patent Number: 5,797,165
[45] Date of Patent: Aug. 25, 1998

[54] EXERCISE GRIP FOR ATTACHMENT TO HANDLEBARS

[76] Inventor: Ronald Oran Armbrust, 1955 W. Henderson St., Apt. 2, Chicago, Ill. 60657

[21] Appl. No.: 61,281

[22] Filed: May 14, 1993

[51] Int. Cl.$^6$ ................................................ A47B 95/02
[52] U.S. Cl. .................. 16/114 R; 482/49; 16/DIG. 12; 16/111 R
[58] Field of Search ................ 16/111 R, 114 R; 482/44, 49, 50, 62; 74/551.9, 551.8

[56] References Cited

U.S. PATENT DOCUMENTS

| | | | |
|---|---|---|---|
| 3,084,547 | 4/1963 | Nielsen | 482/49 |
| 3,129,939 | 4/1964 | Stock | 482/49 |
| 4,240,624 | 12/1980 | Wilson | 482/49 |
| 4,251,071 | 2/1981 | Norton | 482/49 |
| 4,798,377 | 1/1989 | White | 272/67 |
| 4,843,905 | 7/1989 | Jean | 74/551.9 |
| 4,890,355 | 1/1990 | Schulten | 16/111 R |
| 4,941,232 | 7/1990 | Decker et al. | 16/111 R |
| 4,964,192 | 10/1990 | Marui | 16/111 R |
| 5,016,148 | 5/1991 | Kohm | 16/114 R |
| 5,092,588 | 3/1992 | DeLuca | 482/44 |
| 5,195,212 | 3/1993 | Colwell | 16/114 R |

FOREIGN PATENT DOCUMENTS 2229934  10/1990  United Kingdom ............. 482/44

*Primary Examiner*—Chuck Y. Mah
*Attorney, Agent, or Firm*—John P. Halvonik

[57] ABSTRACT

The invention is a method for exercising the hands, fingers and forearms by attaching a squeezable grip to the handlebars of various devices and using the grip for exercise by squeezing on the grip with the hands. The grip is made of resilient material such as rubber, polymeric material, etc. and is sized and shaped for use as an exercise grip. The grip may be constructed with two halves, above and below a plane defined by a central channel with each halve of dissimilar thickness. The device may be attached to any device that has handlebars including: bicycles, exercise bikes, and exercise equipment. The fingers, wrists and forearms would also be worked by such action.

6 Claims, 2 Drawing Sheets

EXERCISE GRIP FOR ATTACHMENT TO HANDLEBARS

FIELD OF INVENTION

1. Background of the Invention

The invention relates to the field of exercising devices and in particular, to a squeezable, exercise grip that may be attached to the handlebars of equipment such as: bicycles, exercising bicycles, exercising cycles, exercising equipment and other devices that come with handle bars.

2. Description of the Prior Art

While there are handle bar grips that are used to enhance the gripping of the hands on the handle bars, no grips that applicant is aware of are squeezable to the extent that they provide a workout for the fingers, hands, wrists, forearms and arms.

SUMMARY OF THE INVENTION

The invention is a method for exercising the hands, etc. of the user of an apparatus with handlebars. A squeezable grip is placed over such handle bars and the user squeezes the grip for exercise. The grip is made of resilient material for providing resistance to the squeezing action of the user. The grip may be of symmetrical cross section or asymmetrical cross section. The materials used may be rubber or resilient polymeric material.

It is an object of the invention to provide a squeezable grip that may be attached to a handle bar for convenient exercising of the arms and hands including fingers, wrists, forearms, etc.

Yet another objective is to provide a squeezable grip that provides an exercising device for the wrists, hands, arms as one is using equipment that has handgrips.

Still another objective of the invention is to provide an exercising grip that can give a portion of the upper body a work out while one is exercising the lower body.

Other objectives of the invention will become apparent to those skilled in the art once the the invention has been shown and described.

DESCRIPTION OF THE PREFERRED EMBODIMENT

Figure 7:
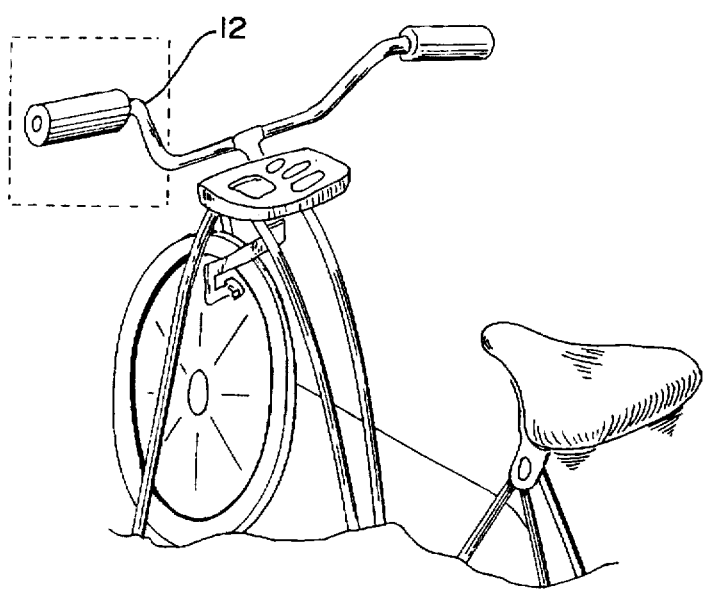
FIG. 7 Grip in use on handlbar.
Figure 7A:
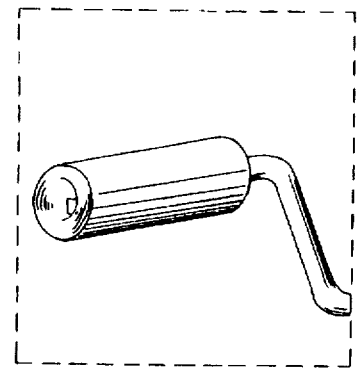
FIG. 7A Shows detail of the grip shown in FIG. 7.

The various parts of the grip are as shown in FIGS. 1–5. As with most handle grips, the grip has an interior passage 10 that is sized and shaped to fit over the end of a handle bar 12 as those found on bicycles and exercising cycles as shown in FIG. 7. Of course, there are many different types of such handlebars that come with all sorts of equipment so the interior passage of the handle should not be construed as being limited to only one set of dimensions and sizes. It is believed that the preferred dimensions of the interior passage would be about 1¼" in diameter and about 6" in length to accommodate many general handlebar sizes.

Figure 1:
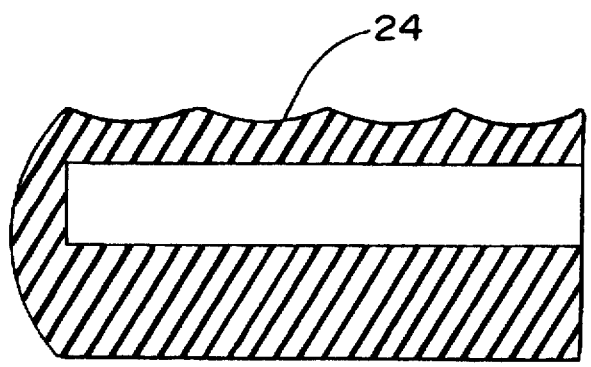
FIG. 1 Side view of grip.
Figure 2:
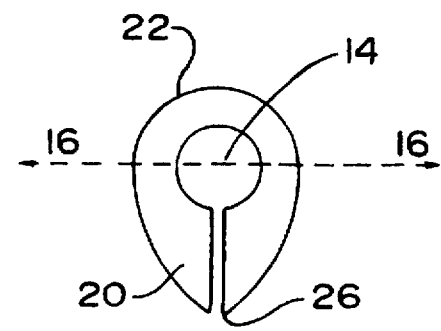
FIG. 2 Cross section of grip, alternate shape with slot and channel.
Figure 3:
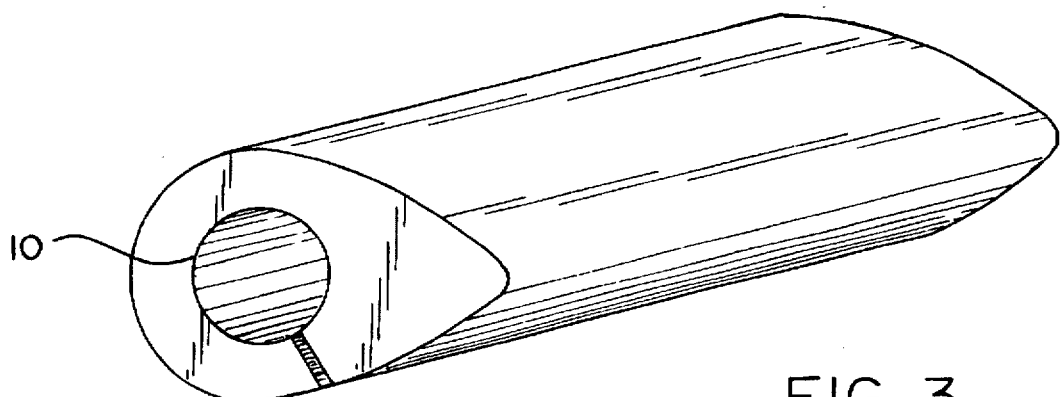
FIG. 3 Three quarter side of the grip.
Figure 4:
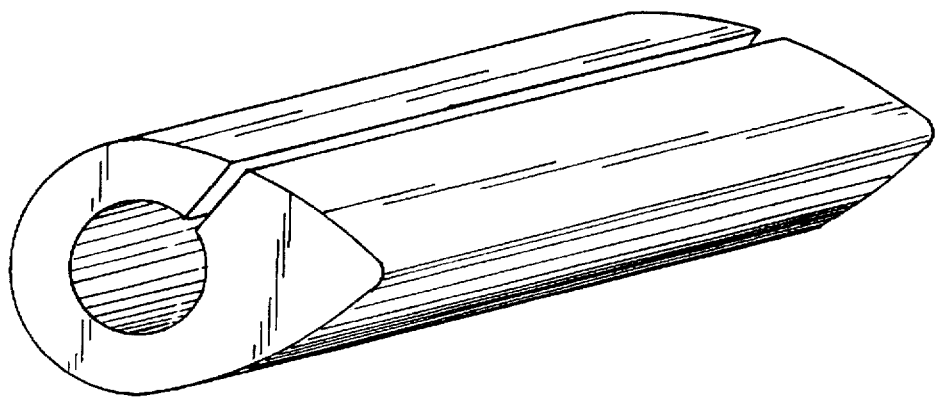
FIG. 4 Three quarter side of the bottom of the grip.
Figure 5:
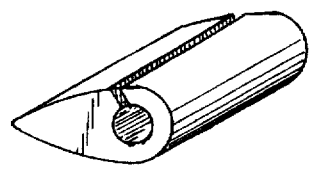
FIG. 5 Perspective side view of grip.
Figures 6A, 6B, 6C, 6D:
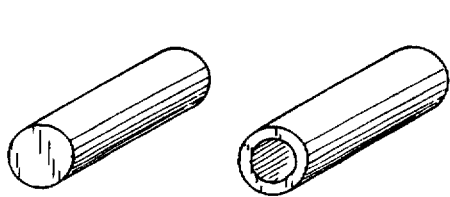
FIG. 6 Alternate configurations.

The grip may be thought of as having an upper and lower portion defined as being above and below a plane 16 running parallel to the center line 14 of the cylindrical channel. One of the portions should be of substantially larger width than the other, say about 1½"–3" thick as opposed to ½"–1" thick for the other portion. This provides a squeezable portion 20 that is to be used for exercising as one is using a bike or other exercising equipment. As seen in FIG. 2 the larger portion is of ovoid or egg-shaped cross section with a pointed portion 30 facing away from the central channel and the broader portion 32 adjacent to the central channel.

The smaller portion 22 would preferably lie on the surface of the handlebars when attached where the fingers typically engage the grip. This portion may be smooth or have grooved 24, or roughened portions to enhance the gripping effect.

The cylindrical channel 26 would, preferably, have a slot in the connection with the channel so as to enable the grip to slide over handle bars of differing size, see FIGS. 2–5.

The material used in the grip should be of a kind that is relatively squeezable for one with an average grip. Obviously, the grip can be made of relatively stronger or weaker material as one chooses. Preferred materials would be e.g. rubber, resilient polymeric material, or other materials that have resiliency.

Other embodiments include adding a weighted object to the grip so that it may be carried while one is jogging and still be used as an exercise for strengthening the hands, arms and shoulders as well. Monitors may be also used in connection with the grip to provide a readout on the user's pulse, etc.

I claim:

1. A method for exercising the hands, wrists, fingers, and forearms of a person who is using an apparatus that has handlebars said method comprising: attaching a gripping apparatus to said handlebars, said gripping apparatus made of resilient material, squeezing said gripping apparatus with the hands to thereby exercise said fingers, wrists, hands and forearms of said user.

2. The method of claim 1 wherein said gripping apparatus has a central channel having an axis and gripping portions above and below a plane parallel to said axis, said gripping portions being of dissimilar thickness.

3. The method of claim 2 wherein said resilient material comprises polymeric material.

4. The method of claim 2 wherein said resilient material comprises rubber.

5. An improved stationary exercise bicycle apparatus having handle bars said improvement comprising: a handgrip of one piece construction and having a central channel so as to define an axis running through said channel and a plane parallel to said axis, said handgrip having two halves, a smaller half on one side of said plane and a larger half on the other side of said plane, said larger half having a cross section of ovoid shape and having a broad portion adjacent to said central channel and a pointed portion facing away from said central channel, said larger half having a slot running through said cross section of said larger half and in connection with said central channel, said handgrip attached to at least one of said handle bars.

6. The apparatus of claim 5 wherein said smaller portion has a surface having grooved finger grip portions.

* * * * *